United States Patent [19]

Maeno

[11] Patent Number: 4,947,478
[45] Date of Patent: Aug. 7, 1990

[54] SWITCHING CONTROL SYSTEM FOR MULTIPERSONALITY COMPUTER SYSTEM

[75] Inventor: Ryozo Maeno, Hamura, Japan

[73] Assignee: Kabushiki Kaisha Toshiba, Kawasaki, Japan

[21] Appl. No.: 170,103

[22] Filed: Mar. 11, 1988

Related U.S. Application Data

[63] Continuation of Ser. No. 706,097, Feb. 27, 1985, abandoned.

[30] Foreign Application Priority Data

Feb. 29, 1984 [JP] Japan .................. 59-37556
Apr. 28, 1984 [JP] Japan .................. 59-86347

[51] Int. Cl.⁵ .............................. G06F 1/24
[52] U.S. Cl. .......................... 364/200; 340/825.51
[58] Field of Search ............. 364/130, 200 MS File, 364/900 MS File, 558, 131; 370/85; 371/49, 51, 1.3; 340/825.06, 825.5, 825.51

[56] References Cited

U.S. PATENT DOCUMENTS

| | | | |
|---|---|---|---|
| 4,151,592 | 4/1979 | Suzuki et al. | 364/200 |
| 4,344,127 | 8/1982 | McDaniel et al. | 364/130 |
| 4,390,944 | 6/1983 | Quackenbush et al. | 364/200 |
| 4,451,882 | 5/1984 | Dshkhunian et al. | 364/200 |
| 4,495,569 | 1/1985 | Kagawa | 364/200 |
| 4,504,906 | 3/1985 | Itaya et al. | 364/200 |
| 4,571,672 | 2/1986 | Hatada et al. | 364/200 |
| 4,590,556 | 5/1986 | Berger et al. | 364/200 |

OTHER PUBLICATIONS

Floyd, "Digital Fundamentals", 1982, pp. 269-273.

*Primary Examiner*—David L. Clark
*Attorney, Agent, or Firm*—Finnegan, Henderson, Farabow, Garrett and Dunner

[57] ABSTRACT

An interprocessor link system has a plurality of processor units having a common input/output device. The system further has at least one flip-flop for setting a processor mode so as to switch between the plurality of processors, and gates for releasing the reset state of one of the processor units in accordance with a value of an output from the flip-flop. One processor unit is set by using the flip-flop. The active processor unit occupies a bus (address/data/status control) commonly used with other processor units. A change in state of the flip-flop is detected by an additional shift register and an exclusive OR gate, and an initialize signal is generated for a predetermined period of time to initialize hardware.

2 Claims, 4 Drawing Sheets

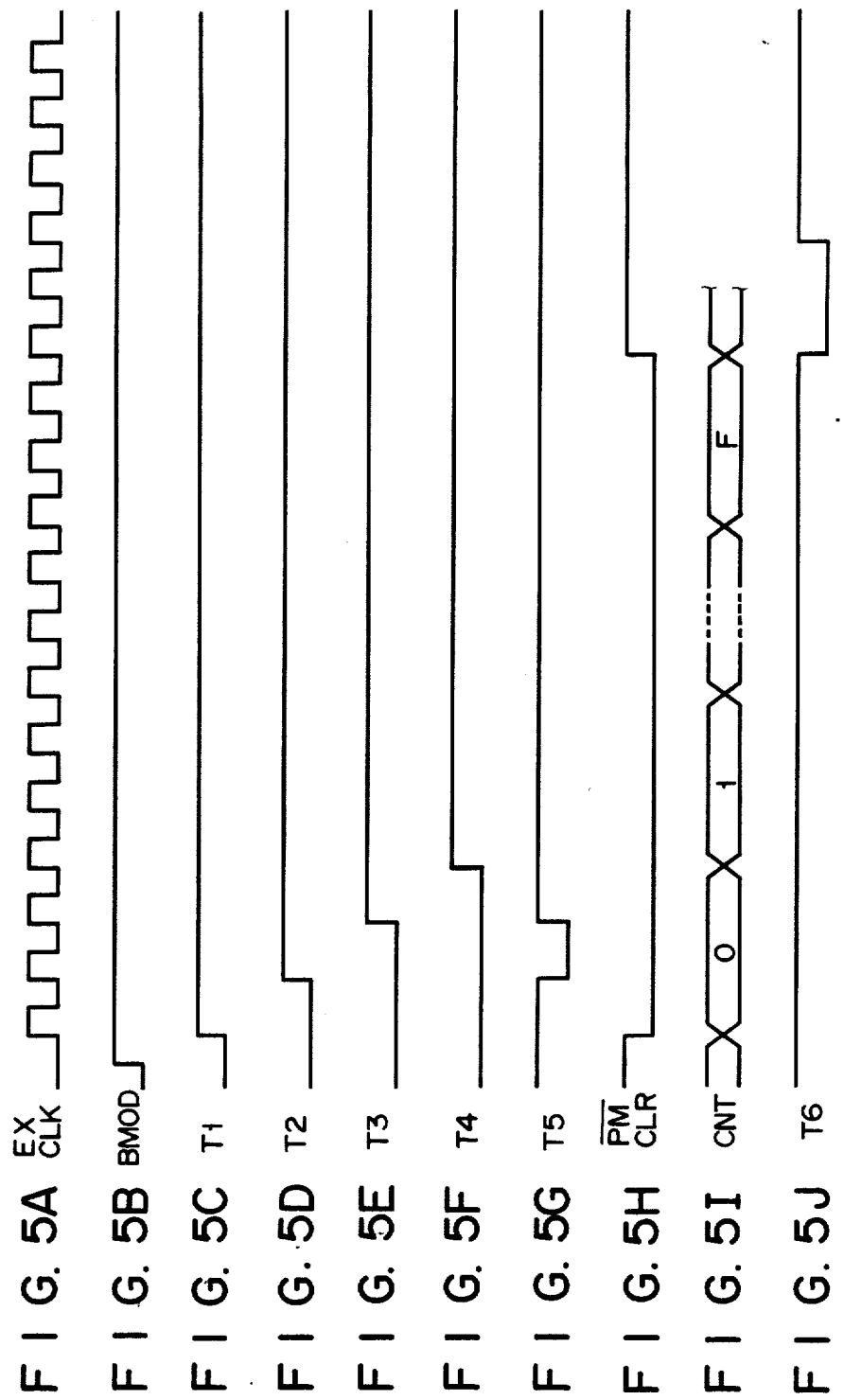

4,947,478

SWITCHING CONTROL SYSTEM FOR MULTIPERSONALITY COMPUTER SYSTEM

This application is a continuation of application Ser. No. 706,097, now abandoned.

BACKGROUND OF THE INVENTION

The present invention relates to a switching control system which makes possible a low-cost multipersonality system.

In general, a data processing system has a processor unit suited to the performance of the system and executes a program written in a native language.

With the recent popularity of personal computers, more standardization is being established in related hardware and basic software. Software houses which are unrelated to hardware manufacturers have begun to distribute application software which is designed not only for use with specific types of equipment but for all standard systems.

This software, which is on the market, is becoming popular. There is a strong demand among users for a single machine which can use application software supplied by the manufacturer and other commercially available software and for a single machine that can use one or all of different classes of commercially available software.

When an attempt is made to realize a multipersonal single processor unit, one of the following systems is generally adopted.

i) An application program is converted by basic software into a format usable by a system.

ii) A single processor unit simulates native languages of various processor units.

However, the former method can only be used if the application program is written in a generally higher level language and thus presents the problem of compatibility. The latter system cannot provide high performance.

SUMMARY OF THE INVENTION

It is an object of the present invention to provide a switching control link system which systematically switches between a plurality of different processor units operated by corresponding operating systems and makes possible a low-cost multipersonal system.

It is another object of the present invention to provide an initialization control system in a multiprocessor system, wherein a small number of hardware components are added to properly initialize the processors at the time of processor mode switching and in which the system initialization is performed by a common hardware resource.

According to the present invention, signals of inactive processors are kept floating, and input/output units of the plurality of processor units can be directly coupled. In this way, an extra driver/receiver circuitry can be eliminated, and a low-cost, high-performance multipersonal system can be provided.

Every time a processor operation is switched, the common hardware resource is initialized to properly perform system initialization.

In order to achieve the above objects of the present invention, there is provided an interprocessor link system, comprising:

a common bus;

at least two processor units which are commonly connected to the common bus processor each unit having a reset input terminal;

flip-flop means, having an input terminal connected to the at least two processor units through the common bus and a clock input terminal connected to a control section through the common bus, for holding processor unit switching data supplied from one of the at least two processor units at a timing of a clock signal supplied from the control section and for supplying an output to a reset input terminal of a processor unit to be reset; and control means, connected to the at least two processor units through the common bus and to the flip-flop means, for receiving control data supplied from one of the at least two processor units and for supplying the clock signal to the flip-flop means.

BRIEF DESCRIPTION OF THE DRAWINGS

Other objects and features of the present invention will be apparent from the following description taken in connection with the accompanying drawings, in which:

FIGS. 5A through 5J are timing charts for explaining the operation of the initialization circuit of FIG. 4.

DETAILED DESCRIPTION OF THE PREFERRED EMBODIMENT

Figure 1:
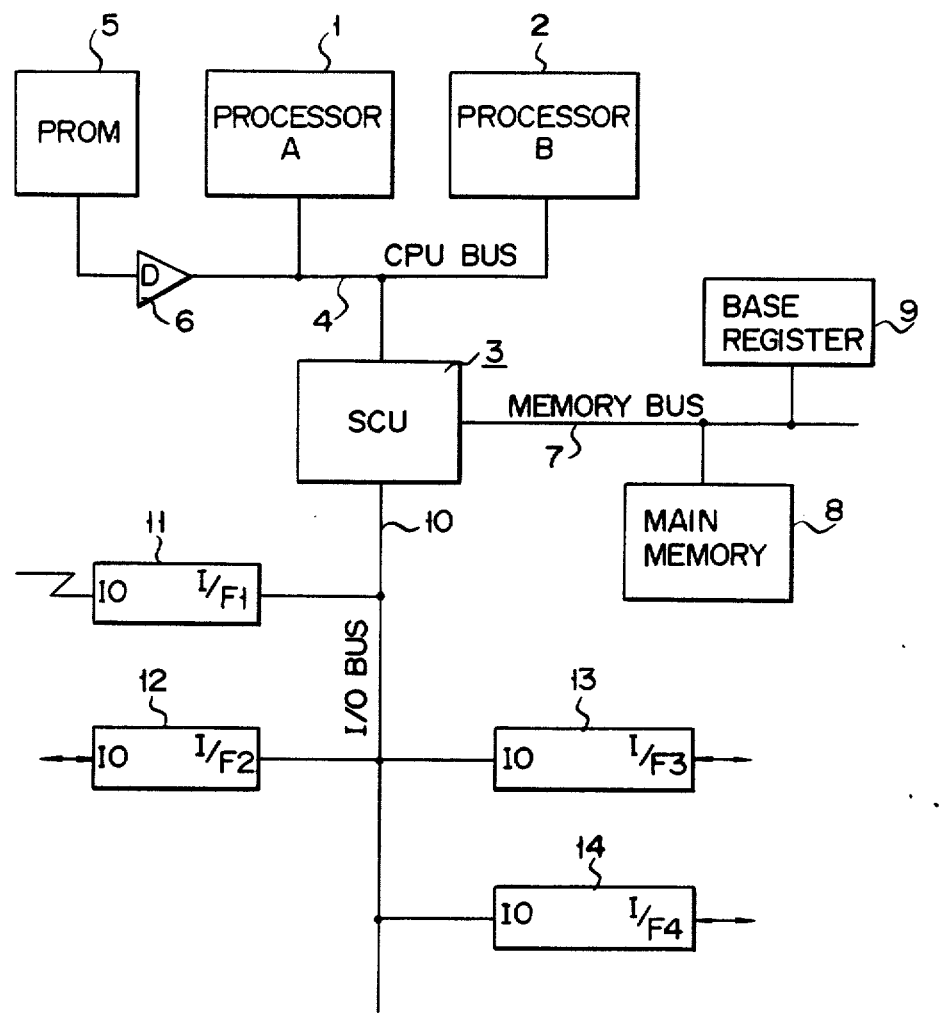
FIG. 1 is a block diagram of an interprocessor link system according to an embodiment of the present invention.

Referring to FIG. 1, a microprocessor 1 comprises a 16-bit architecture microprocessor having a 32-bit bus. A microprocessor 2 comprises a 16-bit architecture microprocessor having a 16-bit bus. In the following description, the processor 1 is referred to as processor unit A, and the processor 2 is referred to as processor unit B for a convenient description. The address buses, data buses and status control buses of the processor units A and B are commonly connected to a CPU bus 4 of a system control unit (SCU) 3. A programmable read-only memory (PROM) 5 stores a microprogram which runs under the control of the processor unit A. The PROM 5 is connected to the CPU bus 4 through a driver 6.

The SCU 3 comprises a switching control section for selecting one of the processor units A and B, a peripheral control section for absorbing access incompatibility between the main memories and I/O devices of the processor units A and B and converting their access procedures to common main memory and I/O device access procedures, and a transfer control section for controlling DMA transfer between the I/O device and the main memory of each of the processor units A and B. Base register 9 is connected to a main memory 8 and a 16-bit memory bus 7 of the SCU 3 to modify addresses when the processor unit A accesses the memory. Different I/O interfaces (I/Fs) 11 through 14 are connected to an 8-bit I/O bus 10. The processor units A and B commonly use an I/O device (not shown) connected thereto through the main memory 8 and the I/O I/Fs 11 through 14.

Figure 2:
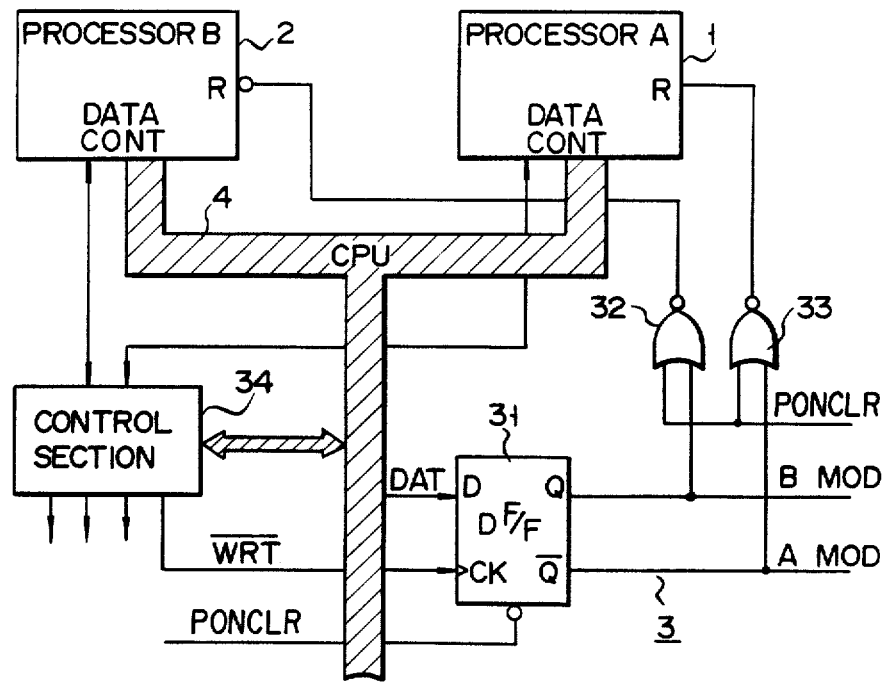
FIG. 2 is a circuit diagram of a switching control section of processor units in the system control unit of FIG. 1.

FIG. 2 is a circuit diagram showing the switching control section in the SCU 3 of FIG. 1. Referring to FIG. 2, a processor mode is set in a D flip-flop 31. More specifically, a processor mode (DAT) signal is supplied from the processor unit A or B to the D input terminal of the D flip-flop 31 through the CPU bus 4. A write strobe ($\overline{WRT}$) signal is supplied from a control section 34 (to be described later) to the CK input terminal. A power ON clear (PONCLR). signal generated upon energization of the system is supplied to one input terminal of each of NO gates 32 and 33. A mode B (B MOD) signal as a Q output from the D flip-flop 31 is supplied to the other input terminal of the NOR gate 32, and a mode A (A MOD) signal as a $\overline{Q}$ output from the D flip-flop 31 is supplied to the other input terminal of the NOR gate 33. NOR outputs from the NOR gates 33 and 32 are supplied to reset input terminals (R) of the microprocessor units A and B, respectively. The control section 34 supplies the write strobe ($\overline{WRT}$) signal to the CK terminal of the flip-flop 31. The address and data buses and the status control signal lines (to be referred to as bus lines hereinafter) of the microprocessor units A and B are directly coupled to the CPU bus 4 of the SCU 3.

Figure 3:
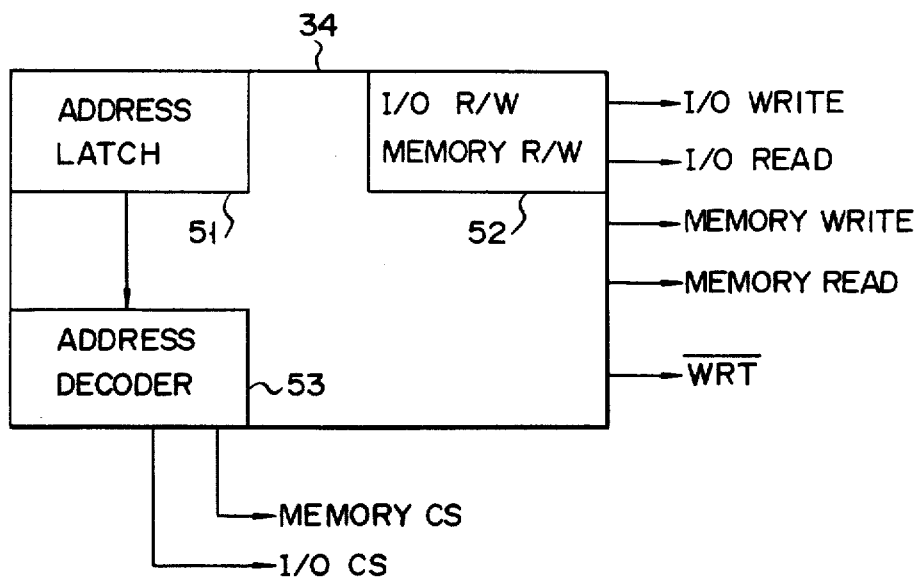
FIG. 3 is a detailed block diagram of the control section shown in FIG. 2.

FIG. 3 is a detailed block diagram of the control section 34 shown in FIG. 2. The control section 34 mainly comprises an address latch circuit 51, an input-/output (I/O) device read/write (R/W) and memory read/write (R/W) circuit 52 and an address decoder 53. In the control section 34, an address signal latched by the address latch circuit 51 is decoded by the address decoder 53 which then generates a memory chip select signal and an I/O chip select signal. Furthermore, in the control section 34, the circuit 52 generates an I/O write signal, an I/O read signal, a memory write signal and a memory read signal.

The operation of the interprocessor link system will now be described hereinafter. In the initialization state, the system is set in the mode A (A MOD) state in response to the clear (PONCLR) signal externally supplied to the flip-flop 31. The processor unit A is operated in the mode A. The mode A and B (A/B MOD) signals ar supplied to the reset input terminals (R) (active low) of the processor units A and B through the NOR gates 33 and 32, respectively.

The mode B (B MOD) signal is kept low, and then the processor unit B is reset. The bus directly coupled to the processor unit A and the control signal are kept floating (open). The mode A (A MOD) signal is kept high, and the processor unit A is released from the reset state. As a result, the processor unit A becomes a CPU bus master and is started.

When mode switching from the processor unit A is required for a particular reason, the content of the flip-flop 31 must be rewritten. For this purpose, data (DAT) is supplied to the control section 34 through the CPU bus 4 so as to switch from the processor unit A to the processor unit B. The mode A signal falls and the mode B signal rises in response to the write strobe ($\overline{WRT}$) signal from the control unit 34.

The low level mode A signal is supplied to the reset terminal R of the processor unit A through the NOR gate 33. The processor unit A sets the bus and the control signal to the floating state. At the same time, the mode B signal having a high level is supplied to the reset terminal R of the processor unit B through the NOR gate 32. In this case, the processor unit B is released from the reset state and is set in the active state.

It should be noted that the mode B can be changed to the mode A in the opposite manner as described above.

Figure 4:
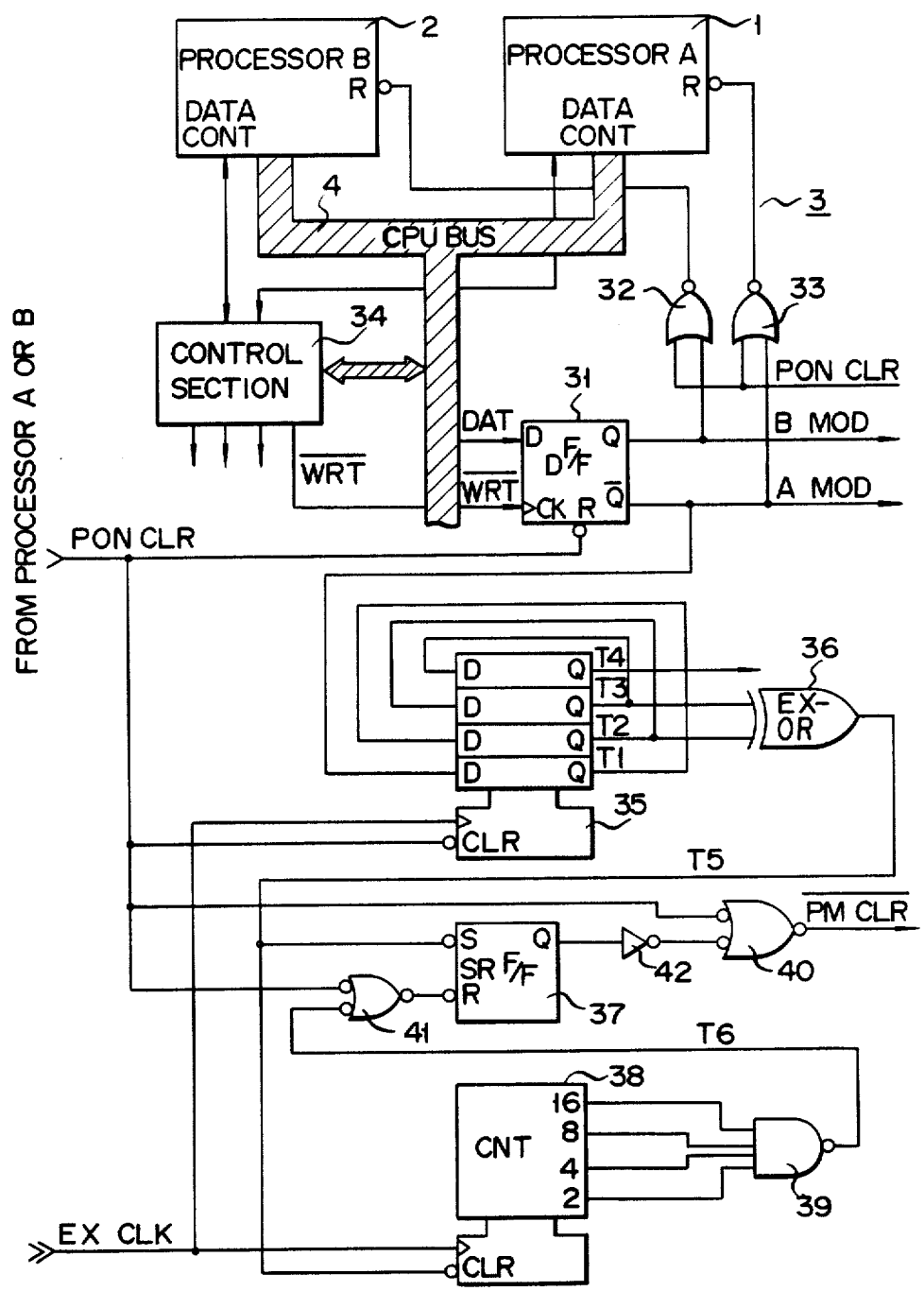
FIG. 4 is a circuit diagram for initializing processor units when processor mode switching is performed in the circuit of FIG. 2.

FIG. 4 is a circuit diagram of a circuit for controlling initialization of the system of FIG. 2. A shift register 35 receives as input data the $\overline{Q}$ output generated from the flip-flop 31 and generates timing signals T1, T2, T3 and T4 in response to external clocks. The timing signals T2 and T3 are supplied to an exclusive-OR gate 36. An exclusive-ORed output signal from the gate 36 is supplied to the set input terminal of an S-R flip-flop 37. A Q output from the flip-flop 37 is supplied to one input terminal of a two-negated input NOR gate 40 through an inverter 42. The other input terminal of the NOR gate 40 receives the power ON clear (PON CLR) signal automatically generated by the system upon energization thereof. A NORed output signal from the gate 40 is supplied as an initialize signal $\overline{PM\text{-}CLR}$ to each hardware resource.

A counter (CNT) 38 counts clock pulses EX CLK periodically generated from an oscillator (not shown) externally connected thereto. A predetermined count of the counter CNT 38 is supplied to the reset input terminal R of the flip-flop 37 through a NAND gate 39 and a NOR gate 41. The PON CLR signal is supplied to the other input terminal of the two-negated input NOR gate 41. When the flip-flop 37 is set, the initialize signal $\overline{PM\text{ }CLR}$ rises to supply the output from the CNT 38 to the reset terminal (R) of the flip-flop 37, thereby allowing the initialize signal $\overline{PM\text{ }CLR}$ to fall.

The operation of the circuit shown in FIG. 4 will be described with reference to timing charts of FIGS. 5A through 5J.

The PON CLR signal is supplied from the processor unit A or B upon energization of the system to the reset input terminal R of the flip-flop 37 through NOR gate 41, the reset terminal R of the flip-flop 31, the CLR terminal of the shift register 35, one input terminal of the NOR gate 40 and the NOR gate 41. The flip-flop 31, the shift register 35 and the flip-flop 37 are then reset. The NOR gate 40 generates the $\overline{PM\text{ }CLR}$ signal shown in FIG. 5H. The entire hardware including the common hardware resource is initialized in response to the $\overline{PM\text{ }CLR}$ signal.

Assume that a processor switching command is generated from the processor unit A or B. In this case, the flip-flop 31 is set. The A MOD signal as the $\overline{Q}$ output from the flip-flop 31 is supplied to the shift register 35. The shift register 35 sequentially generates the timing signals T1 through T4 (FIGS. 5C through 5F) in response to the external clock pulses (EX CLK) shown in FIG. 5A. The timing signals T2 and T3 are EX-ORed by the gate 36 which then generates the timing signal T5 shown in FIG. 5G. The timing signal T5 is supplied to the set input terminal S of the flip-flop 37 and the clear input terminal CLR of the CNT 38. The Q output from the flip-flop 37 is supplied to the other input terminal of the two-negated NOR gate 40 through the inverter 42. This NOR gate 40 generates the $\overline{PM\text{ }CLR}$ signal shown in FIG. 5H. The CNT 38 is cleared. The CNT 38 sequentially performs counting (FIG. 5I) in response to the EX-CLK pulses shown in FIG. 5A. When a CNT 38 has reached a predetermined count (16 in this embodiment), the NAND gate 39 supplies the signal T6 (FIG. 5J) to the reset input terminal R of the flip-flop 37 through the NOR gate 41, thereby resetting flip-flop 37. Then, the output $\overline{PM\text{ }CLR}$ from the NOR gate 40 becomes OFF. The $\overline{PM\text{ }CLR}$ signal is thus generated for a predetermined period of time, as shown in FIG. 5H. The respective hardware components of FIG. 2 are initialized.

What is claimed is:

1. A switching control system for a multipersonality computer system, comprising:
   n microprocessors operated in respectively different operating systems, each of said n microprocessors using a plurality of common peripheral devices, wherein n is a positive integer;
   a common bus connected to said n microprocessors;
   means for operating a predetermined one of said n microprocessors as a specified microprocessor in response to a power-on signal of said multipersonality computer system, said specified microprocessor determining whether an externally supplied microprocessor selection signal specified said specified microprocessor itself or another one of said n microprocessors and, when said another microprocessor is specified, outputting a switching signal for switching an operation to said another microprocessor; and
   microprocessor switching means, coupled to respective reset inputs of said n microprocessors, for controlling an operating state of each of said n microprocessors, said switching means being responsive to said switching signal, for setting said specified microprocessor in a non-operating state and setting only the one of the n microprocessors specified by said microprocessor selection signal in an operating state, so that only one of said n microprocessors is operated at any one time.

2. A switching control system for a multipersonality computer system, comprising:
   n microprocessors operated in respectively different operating systems, each of said n microprocessors using a plurality of common peripheral devices, wherein n is a positive integer;
   a common bus connected to said n microprocessors;
   means for operating a predetermined one of said n microprocessors as a specified microprocessor in response to a power-on signal of said multipersonality computer system, said specified microprocessor determining whether an externally supplied microprocessor selection signal specifies said specified microprocessor itself or another microprocessor and, when said another microprocessor is specified, outputting a switching signal for switching an operation to said another microprocessor;
   microprocessor switching means, responsive to said switching signal, for setting said specified microprocessor in a non-operating state and setting the microprocessor specified by said microprocessor selection signal in an operating state;
   state change detecting means for detecting a state change in a state of said microprocessor switching means and generating a state change detection signal in response to said state change;
   initialize signal output means, responsive to said state change detection signal supplied from said state change detecting means, for generating an initialize signal, having a predetermined time interval, operative to initialize any of said plurality of common peripheral devices in response to said state change detection signal;
   said state change detecting means comprising
      a shift register for receiving an output signal from said microprocessor switching means and generating a sequentially shifted signal, and
      an exclusive OR gate for receiving the sequentially shifted signal and for generating a timing signal for allowing the initialize signal to rise; and said initialize signal output means comprising
   flip-flop means for generating the initialize signal in response to the timing signal from said exclusive OR gate, and
   a counter for resetting said flip-flop means so as to allow the initialize signal to fall when the predetermined time interval has elapsed.

* * * * *